(12) United States Patent
    Bouda (10) Patent No.: US 11,250,409 B2
(45) Date of Patent: Feb. 15, 2022

(54) METHOD AND APPARATUS FOR PROVIDING SECURE SERVICES USING A MOBILE DEVICE

(71) Applicant: Bell Identification BV, Rotterdam (NL)

(72) Inventor: Mohammed Chakib Bouda, Rotterdam (NL)

(73) Assignee: BELL IDENTIFICATION BV, Rotterdam (NL)

( * ) Notice: Subject to any disclaimer, the term of this patent is extended or adjusted under 35 U.S.C. 154(b) by 946 days.

(21) Appl. No.: 14/431,204

(22) PCT Filed: Sep. 27, 2013

(86) PCT No.: PCT/EP2013/070236
    § 371 (c)(1),
    (2) Date: Mar. 25, 2015

(87) PCT Pub. No.: WO2014/049136
    PCT Pub. Date: Apr. 3, 2014

(65) Prior Publication Data
    US 2015/0262170 A1    Sep. 17, 2015

(30) Foreign Application Priority Data
    Sep. 28, 2012    (GB) ..................... 1217448

(51) Int. Cl.
    *G06Q 20/32*    (2012.01)
    *H04L 9/32*    (2006.01)
    (Continued)

(52) U.S. Cl.
    CPC ........... *G06Q 20/322* (2013.01); *G06F 21/44* (2013.01); *G06Q 20/3223* (2013.01);
    (Continued)

(58) Field of Classification Search
    CPC ........... G06Q 20/3829; G06Q 20/3226; G06Q 20/3223; G06Q 20/401; G06Q 2220/00;
    (Continued)

(56) References Cited

U.S. PATENT DOCUMENTS 8,312,272 B1 * 11/2012 Serenyi ............... G06F 21/33
                                                  713/168
8,332,329 B1 * 12/2012 Thiele ............... G06Q 20/0425
                                                  705/64

(Continued)

FOREIGN PATENT DOCUMENTS

WO    2004077369    9/2004

OTHER PUBLICATIONS

Chip and PIN: What is ARQC?, http://chipnpin.blogspot.de/2012/01/what-is-arqc.html.

(Continued)

*Primary Examiner* — Oluseye Iwarere
*Assistant Examiner* — Jason B Fenstermacher
(74) *Attorney, Agent, or Firm* — Kilpatrick Townsend & Stockton LLP (57) ABSTRACT

This invention relates generally to methods and apparatus for providing secure services using a mobile device, and in particular for securely making transactions, such as payments, using mobile phones and smartphones.

18 Claims, 6 Drawing Sheets

(51) Int. Cl.
  *G06F 21/44* (2013.01)
  *H04W 12/08* (2021.01)
  *H04W 12/033* (2021.01)
  *G06Q 20/38* (2012.01)
  *G06Q 20/40* (2012.01)

(52) U.S. Cl.
  CPC ..... *G06Q 20/3226* (2013.01); *G06Q 20/3829* (2013.01); *G06Q 20/401* (2013.01); *H04L 9/3226* (2013.01); *H04W 12/033* (2021.01); *H04W 12/08* (2013.01); *G06Q 2220/00* (2013.01); *H04L 2209/805* (2013.01)

(58) Field of Classification Search
  CPC . G06Q 20/32; H04L 9/3226; H04L 2209/805; H04W 12/0013; H04W 12/08; G06F 21/44
  See application file for complete search history.

(56) References Cited

U.S. PATENT DOCUMENTS

| | | | | |
|---|---|---|---|---|
| 9,654,574 | B2* | 5/2017 | Ludwig | .............. H04W 12/02 |
| 2007/0014408 | A1 | 1/2007 | Narendra et al. | |
| 2007/0058815 | A1 | 3/2007 | Kwak et al. | |
| 2009/0063312 | A1 | 3/2009 | Hurst | |
| 2009/0327107 | A1 | 12/2009 | Lal et al. | |
| 2010/0186075 | A1* | 7/2010 | Hohlbaum | .............. G06F 21/33 |
| | | | | 726/7 |
| 2010/0250290 | A1* | 9/2010 | Lefkowitz | ............ G06Q 20/204 |
| | | | | 705/5 |
| 2011/0071914 | A1 | 3/2011 | Beasley et al. | |
| 2011/0320293 | A1* | 12/2011 | Khan | ................ G06Q 20/3223 |
| | | | | 705/16 |
| 2011/0320345 | A1 | 12/2011 | Taveau et al. | |
| 2012/0028609 | A1 | 2/2012 | Hruska | |
| 2012/0150687 | A1* | 6/2012 | Hart | ................... G06Q 30/0613 |
| | | | | 705/26.41 |
| 2013/0095754 | A1* | 4/2013 | Moreton | ............ G06K 19/0727 |
| | | | | 455/41.1 |
| 2014/0025958 | A1* | 1/2014 | Caiman | .................. G06F 21/33 |
| | | | | 713/189 |

OTHER PUBLICATIONS

EP Communication Pursuant to Article 94(3) EPC dated Apr. 5, 2017 re: EP Appln. No. 13766565.9. 10 Pages.
EP Response Filed on Jul. 17, 2017 in Response to EP Article 94(3) EPC dated Apr. 5, 2017 re: EP Appln. No. 13766565.9. 17 Pages.
AU 2013322599 , "First Examination Report", dated Sep. 10, 2018, 5 pages.
AU 2019226230 , "First Examination Report", dated Jun. 12, 2020, 5 pages.
Application No. CA 2885,910 , Office Action, dated Sep. 1, 2020, 7 pages.
Application No. CA 2885910 , Office Action, dated Aug. 6, 2019, 6 pages.
EP 13766565.9 , "Summons to Attend Oral Proceedings", Jun. 29, 2018, 14 pages.
Application No. PCT/EP2013/069968 , International Search Report and Written Opinion, dated Feb. 5, 2014, 10 pages.
Application No. PCT/EP2013/070236 , International Search Report and Written Opinion, dated Feb. 19, 2014, 14 pages.
AU2019226230 , "Third Examination Report", dated Mar. 31, 2021, 5 pages.

* cited by examiner

METHOD AND APPARATUS FOR PROVIDING SECURE SERVICES USING A MOBILE DEVICE

CROSS-REFERENCE TO RELATED APPLICATIONS

This is the United States National Phase of PCT Application No. PCT/EP2013/070236 filed 27 Sep. 2013 which claims priority to British Patent Application No. 1217448.8 filed 28 Sep. 2012, each of which are incorporated herein by reference.

BACKGROUND OF THE INVENTION

This invention relates generally to methods and apparatus for providing secure services using a mobile device, and in particular for securely making transactions, such as payments, using mobile phones and smartphones.

BACKGROUND

There is an ongoing interest in providing financial services through mobile devices such as mobile phones and smartphones. Typically these financial services include making transactions, such as purchasing goods, by making payments from a user financial account using the mobile device.

In order to make purchases by payments from a user account using a mobile device it is necessary to exchange information between a user mobile device, a vendor point of sale device and a bank transaction processing system, and it is necessary to make these exchanges of information in a secure manner in order to prevent fraud.

However, proposed methods of making secure payments through mobile devices suffer from a number of problems. It is difficult for the bank to maintain control of the payment process, because this generally requires the co-operation of other parties, raising issues of control, trust and reliability. Further, they may require large amounts of memory or processing power on the mobile device.

It is therefore an object of the invention to provide improved means for providing secure services on a mobile device.

GENERAL

According to a first aspect the invention may provide a method of providing secure services using a mobile device, the method comprising the steps of: the mobile device sending a token request comprising device identification data identifying the mobile device to a server; the server generating an asymmetric key pair comprising a public key and a private key, and sending the public key to the mobile device; the mobile device requesting entry of a user identity verifier; the mobile device encrypting the entered user identity verifier using the public key and sending the encrypted user identity verifier to the server; the server decrypting the user identity verifier and comparing the user identity verifier to a stored user identity verifier to verify the user, and comparing the device identification data to stored eligible device identification data to verify the device; if both verifications are successful, the server sending a token to the mobile device; the mobile device storing the token; the mobile device establishing communication with a service provider device; the service provider device sending service data regarding a requested service to the mobile device; the mobile device sending the token to the service provider device; and the service provider device confirming that the token is valid, and if the confirmation is successful, executing the requested service. According to a second aspect the invention provided is a method of providing secure services using a mobile device, the method comprising the steps of: the mobile device sending a token request comprising device identification data identifying the mobile device to a server; the server comparing the device identification data to stored eligible device identification data to verify the device; if the verification is successful, the server sending a token to the mobile device; the mobile device storing the token; the mobile device establishing communication with a service provider device; the service provider device sending service data regarding a requested service to the mobile device; the mobile device sending the token to the service provider device; and the service provider device confirming that the token is valid, and if the confirmation is successful, executing the requested service.

Preferably, the method further comprises the steps of: the server generating an asymmetric key pair comprising a public key and a private key, and sending the public key to the mobile device; the mobile device requesting entry of a user identity verifier; the mobile device encrypting the entered user identity verifier using the public key and sending the encrypted user identity verifier to the server; the server decrypting the user identity verifier and comparing the user identity verifier to a stored user identity verifier to verify the user; and if the verification are successful, the server sending a token to the mobile device. Preferably, the mobile device requests entry of the user identity verifier each time the server receives a token request and/or intermittently. The mobile device may request entry of the user identity intermittently based on at least one of: time; number of tokens issued; value of tokens issued. The mobile device may request entry of the user identity verifier the first time the server receives a token request.

The mobile device may request and store a plurality of tokens. Each token may have an associated maximum value and the service data regarding a requested service may identify a value of a requested service; and further comprising the step of: the mobile device comparing the value of the requested service to the maximum value associated with a token; and if the value of the requested service is less than or equal to the maximum value of the token, then, sending the token to the service provider device.

Preferably, the token request further comprises account identification data identifying a financial account and the token can be used to identify the financial account. Executing the requested service may comprise the steps of: the service provider device contacting a bank system and sending the bank system data identifying a financial account, the service provider device data, and the service data to the bank system; the bank system verifying the data identifying the financial account and the service provider device data, and verifying that the financial account can support the requested service, if these verifications are successful, the bank system sending authorization to complete the service to the service provider device; and if the authorization is received, the service provider device completing the requested service. The data identifying the financial account may be derived from the token or the data identifying the financial account may be the token.

According to a third aspect the invention provided is a method of providing secure services using a mobile device, the method comprising the steps of: the mobile device sending device identification data identifying the mobile device to a server; the server generating an asymmetric key pair comprising a public key and a private key, and sending the public key to the mobile device; the mobile device requesting entry of a user identity verifier; the mobile device encrypting the entered user identity verifier using the public key and sending the encrypted user identity verifier to the server; the server decrypting the user identity verifier and comparing the user identity verifier to a stored user identity verifier to verify the user, and comparing the device identification data to stored eligible device identification data to verify the device; if both verifications are successful, the server sending a validation message to the mobile device; the mobile device establishing communication with a service provider device and sending the validation message to the service provider device; the service provider device sending service data regarding a requested service and service provider device data identifying the service provider device to the mobile device; the mobile device encrypting the service data and the service provider device data using the public key, and sending the encrypted service data and service provider device data to the server; the server decrypting the received service data and the service provider device data and comparing the service provider device data with stored service provider device data to verify the service provider device; if the verifications are successful, the server sending service authorization data to the mobile device; the mobile device sending the service authorization data to the service provider device; and the service provider device confirming that the service authorization data is valid, and if the confirmation is successful, executing the requested service.

Preferably, the mobile device sends account identification data identifying a financial account to the server, and the mobile device sends account identification data to the service provider device.

Preferably, executing the requested service comprises the steps of: the service provider device contacting a bank system and sending the bank system the account identification data, the service provider device data, and the service data to the bank system; the bank system verifying the account identification data and the service provider device data, and verifying that the financial account can support the requested service, if these verifications are successful, the bank system sending authorization to complete the service to the service provider device; and if the authorization is received, the service provider device completing the requested service.

Preferably, the method further comprises a step of selecting a financial account from a number of available financial accounts.

The account identification data may identify a virtual financial transaction card. The virtual financial transaction card may be a virtual credit card.

Preferably, the server generates a plurality of asymmetric key pairs and randomly selects one of the key pairs to be used in the method. The user identity verifier may be a PIN.

The mobile device may request entry of the user identity verifier after receiving the public key.

The user identity verifier may be encrypted using the device identification data and the public key.

The service provider device may confirm receipt of the validation message to the user.

The service provider device may be a point of sale "POS" terminal.

The communications between the mobile device and the service provider device may be encrypted.

Preferably, the requested service is a financial transaction. The requested service may be a purchase.

The service data may comprise a financial value.

The requested service may be unlocking a door. The requested service may be operating an access control device. The requested service may be providing access to and/or control over a part of a computer system or network. The requested service may be providing access through a gateway.

The transaction authorization data may be encrypted.

Preferably, the requested service is an EMV transaction. The token may be an ARQC cryptogram.

According to a fourth aspect the invention provided is a method of providing secure services using a mobile device, the method comprising the steps of: the mobile device determining whether or not it can communicate with a server; and if the mobile device determines that it can communicate with the server, the mobile device using the method of the third aspect of the invention to provide the secure services; or if the mobile device determines that it cannot communicate with the server, the mobile device using the method of the first or second aspects of the invention to provide the secure services.

According to a fifth aspect the invention provided is a system for providing secure services using a mobile device, the system comprising: a mobile device; a server; and a service provider device; the system being adapted such that the mobile device sends a token request comprising device identification data identifying the mobile device to the server; the server generates an asymmetric key pair comprising a public key and a private key, and sends the public key to the mobile device; the mobile device requests entry of a user identity verifier; the mobile device encrypts the entered user identity verifier using the public key and sends the encrypted user identity verifier to the server; the server decrypts the user identity verifier and compares the user identity verifier to a stored user identity verifier to verify the user, and compares the device identification data to stored eligible device identification data to verify the device; wherein if both verifications are successful, the server sends a token to the mobile device; the mobile device stores the token; the mobile device establishes communication with the service provider device; the service provider device sends service data regarding a requested service to the mobile device; the mobile device sends the token to the service provider device; and the service provider device confirms that the token is valid, and if the confirmation is successful, executes the requested service.

According to a sixth aspect the invention provided is a system for providing secure services using a mobile device, the system comprising: a mobile device; a server; a service provider device; the system being adapted such that the mobile device sends a token request comprising device identification data identifying the mobile device to a server; the server compares the device identification data to stored eligible device identification data to verify the device; wherein if the verification is successful, the server sends a token to the mobile device; the mobile device stores the token; the mobile device establishes communication with the service provider device; the service provider device sends service data regarding a requested service to the mobile device; the mobile device sends the token to the service provider device; and the service provider device confirms that the token is valid, and if the confirmation is successful, executes the requested service.

According to a seventh aspect the invention provided is a system for providing secure services using a mobile device, the system comprising: a mobile device; a server; and a service provider device; the system being adapted such that the mobile device sends device identification data identifying the mobile device to the server; the server generates an asymmetric key pair comprising a public key and a private key, and sends the public key to the mobile device; the mobile device requests entry of a user identity verifier; the mobile device encrypts the entered user identity verifier using the public key and sends the encrypted user identity verifier to the server; the server decrypts the user identity verifier and compares the user identity verifier to a stored user identity verifier to verify the user, and compares the device identification data to stored eligible device identification data to verify the device; wherein if both verifications are successful, the server sends a validation message to the mobile device; the mobile device establishes communication with a service provider device and sends the validation message to the service provider device; the service provider device sends service data regarding a requested service and service provider device data identifying the service provider device to the mobile device; the mobile device encrypts the service data and the service provider device data using the public key, and sends the encrypted service data and service provider device data to the server; the server decrypts the received service data and the service provider device data and compares the service provider device data with stored service provider device data to verify the service provider device; wherein if the verifications are successful, the server sends service authorization data to the mobile device; the mobile device sends the service authorization data to the service provider device; and the service provider device confirms that the service authorization data is valid, and if the confirmation is successful, executes the requested service.

According to an eighth aspect the invention provided is a system for providing secure services using a mobile device, the system comprising: a mobile device; a server; and a service provider device; the system being adapted such that the mobile device determines whether or not it can communicate with a server; and if the mobile device determines that it can communicate with the server, the mobile device using the method of the third aspect of the invention to provide the secure services; or if the mobile device determines that it cannot communicate with the server, the mobile device using the method of the first or second aspects of the invention to provide the secure services.

DESCRIPTION OF FIGURES

The invention will now be described in detail with reference to the following figures in which.

DETAILED DESCRIPTION

Figure 1:
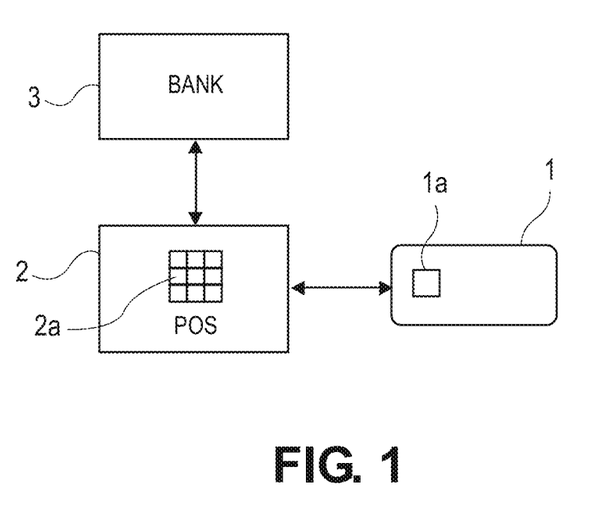
FIG. 1 is a diagram of a transaction arrangement system using a credit card.

An example of a known method of making transactions using a credit card will now be described with reference to FIG. 1. FIG. 1 shows the apparatus used to make the transaction.

A user wishing to make a transaction, for example a purchase, presents a credit card 1 to a vendor point of sale (POS) device 2 and places the credit card 1 in communication with the POS device 2. The credit card 1 is of the well known Europay, Mastercard and VISA (EMV) or Chip and Pin card type having a microprocessor, or chip, 1a integral with the credit card 1 and providing an on card data storage and processing capability. The credit card 1 may be placed in communication with the POS device 2 by conductive contacts or by wireless means, such as near field communication (NFC).

Once communication is established between the card 1 and the POS device 2, the card 1 sends card data identifying the card 1 to the POS device 2. The POS device 2 then invites the user to input a personal identification number (PIN) using a keypad 2a on the POS device 2. When the user PIN has been input the POS device 2 sends the input PIN to the card 1, and the card 1 compares the user input PIN to a PIN stored on the chip 1a of the card 1. If the input PIN and the stored PIN match the card 1 confirms to the POS device 2 that the user PIN has been authenticated.

In response to receiving confirmation that the user PIN is authenticated the POS device 2 contacts a bank transaction processing system 3, generally by telephone, and sends the card data identifying the card 1, the user input PIN, POS data identifying the POS device 2, and the value of the transaction to the bank system 3.

The bank system 3 checks the received card data, POS data and input PIN and performs authentication processes to confirm that the card 1 and POS device 2 are authentic and authorized, and to confirm that the input PIN is correct, and checks the available funds or credit in the account corresponding to the card 1 to confirm that the available funds or credit are sufficient to cover the transaction.

If the authentications are successful and the necessary funds are available, the bank system 3 sends authorization to carry out the transaction to the POS device 2 together with encryption information. The POS device 2 then carries out the transaction and sends encrypted details of the transaction to the bank system 3, the encrypted transaction details being encrypted using the encryption information provided by the bank system 3. The bank system 3 then decrypts the received transaction details and records the transaction, and a bank back end system makes any necessary changes to the balance of the account corresponding to the card 1 or other bank records, as appropriate.

The above description explains the payment process in the usual case where the transaction and parties are legitimate and that all of the authentications are successful. It will be understood that, in general, if an authentication fails the transaction will be aborted or delayed while further checks or alternative procedures are followed. The decision whether to abort or delay the transaction, and/or exactly what further or alternative action will be taken will vary from case to case.

Although the credit card transaction method discussed above is commonly used it gives rise to a number of problems. Firstly, it is relatively costly for banks to print the necessary physical credit cards and to distribute them to users. Further, the data held on the credit card, such as the card data identifying the card and the user PIN must be protected by encryption and other security measures, and it is generally necessary to replace the credit card in order to improve the encryption and security, making such improvements expensive to implement. Further, it may be inconvenient for users to carry credit cards.

The example described above relates to the use of a credit card to carry out a transaction. The same method and apparatus may be used to carry out transactions using other types of financial transaction cards, such as debit cards and pre-paid cards. The identified problems also apply to these other types of cards.

In order to address these problems it has been proposed to carry out transactions using a mobile phone instead of a credit card, or other financial transaction card.

Figure 2:
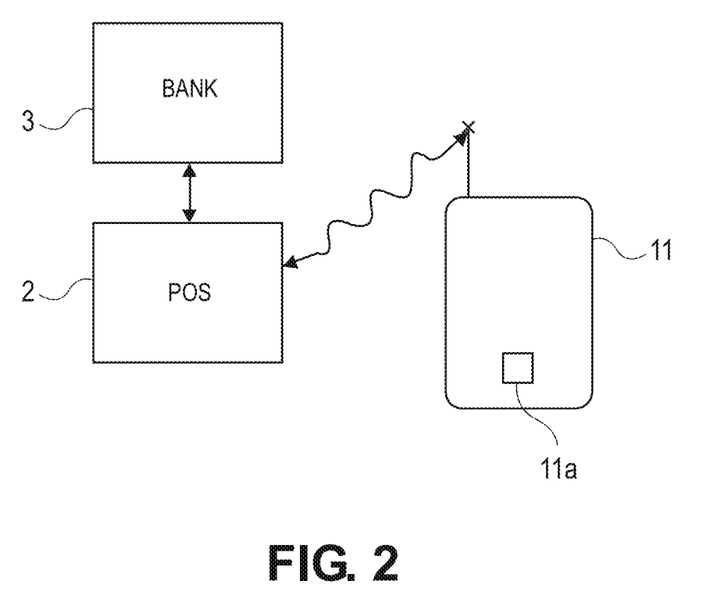
FIG. 2 is a diagram of a transaction arrangement system using a mobile phone.

An example of a proposed alternative method of making transactions will now be described with reference to FIG. 2. FIG. 2 shows the apparatus used to make the transaction.

In this alternative example transactions are made using a mobile phone 11 instead of a financial transaction card such as the credit card 1 as in the previous example.

The mobile phone 11 contains a processor 11a supporting a security system. The security system is implemented by software operating on the processor 11a. The processor 11a may, for example, be a general purpose processor of the mobile phone 11, a processor of a SIM card of the mobile phone 11, or a dedicated security processor of the mobile phone 11. Where the processor 11a is a dedicated security processor of the mobile phone 11, the processor 11a may be integrated with the other mobile phone electronics, or may simply be physically located in or on the mobile phone 11 without being connected to the electronics of the mobile phone 11.

A user wishing to make a transaction, for example a purchase, presents the mobile phone 11 close to a vendor point of sale (POS) device 2 and the mobile phone 11 enters into communication with the POS device 2 by wireless means, such as near field communication (NFC).

Once communication is established between the mobile phone 11 and the POS device 2, the mobile phone 11 sends phone data identifying the mobile phone 11 to the POS device 2. The POS device 2 then invites the user to input a personal identification number (PIN) using a keypad on the POS device 2.

When the user PIN has been input the POS device 2 sends the input PIN to the mobile phone 11. The mobile phone 11 compares the user input PIN to a PIN stored on the mobile phone 11. If the input PIN and the stored PIN match the mobile phone 11 confirms to the POS device 2 that the user PIN has been authenticated. The user input PIN may be sent from the POS device 2 to the mobile phone 11 in an encrypted form.

In response to receiving confirmation that the user PIN is authenticated, the POS device 2 contacts a bank transaction processing system 3, generally by telephone, and sends the phone data identifying the mobile phone 11, data confirming that the user PIN is authenticated, POS data identifying the POS device 2, and the value of the transaction to the bank system 3.

The bank system 3 then operates in a similar manner to that discussed in the previous example to authorize and carry out the transaction, and update the account balance and other bank records.

As discussed above, it is desirable to carry out transactions using a mobile phone instead of a credit card. However, there are a number of problems with the method described above. Firstly, the location of the security system on the mobile phone raises issues of control and security regarding the security system because the security system is not wholly under the control of the bank and cannot be defined or changed unilaterally by the bank. Instead, control is generally shared between the bank, the original equipment manufacturer producing the phone, and the carrier supporting data communications to the mobile phone, and defining and changing the security system will generally require the agreement and cooperation of all of these parties. Further, the amount of data storage and processing required to support the security system on the mobile phone can be relatively large and may tend to grow over time as the security system is improved to counter new threats. As a result, there can be problems with some mobile phones, or some processors associated with the mobile phones, not being able to support the security system. Further, many users have a number of different credit cards corresponding to different accounts and extending this method to replace multiple cards would require a separate security device for each card, potentially greatly increasing the amount of data storage and processing required to support the different security systems on the mobile phone. Further, where the mobile phone is a smartphone there are increased security risks because of the many possible ways of interfacing with smartphones, which provide more routes and techniques to attack the security system, for example by using apparently benign software applications, or apps, downloaded onto the smartphone to attack the security system.

Accordingly, the present invention provides an improved method of using a mobile communication device to carry out secure transactions.

Figure 3:
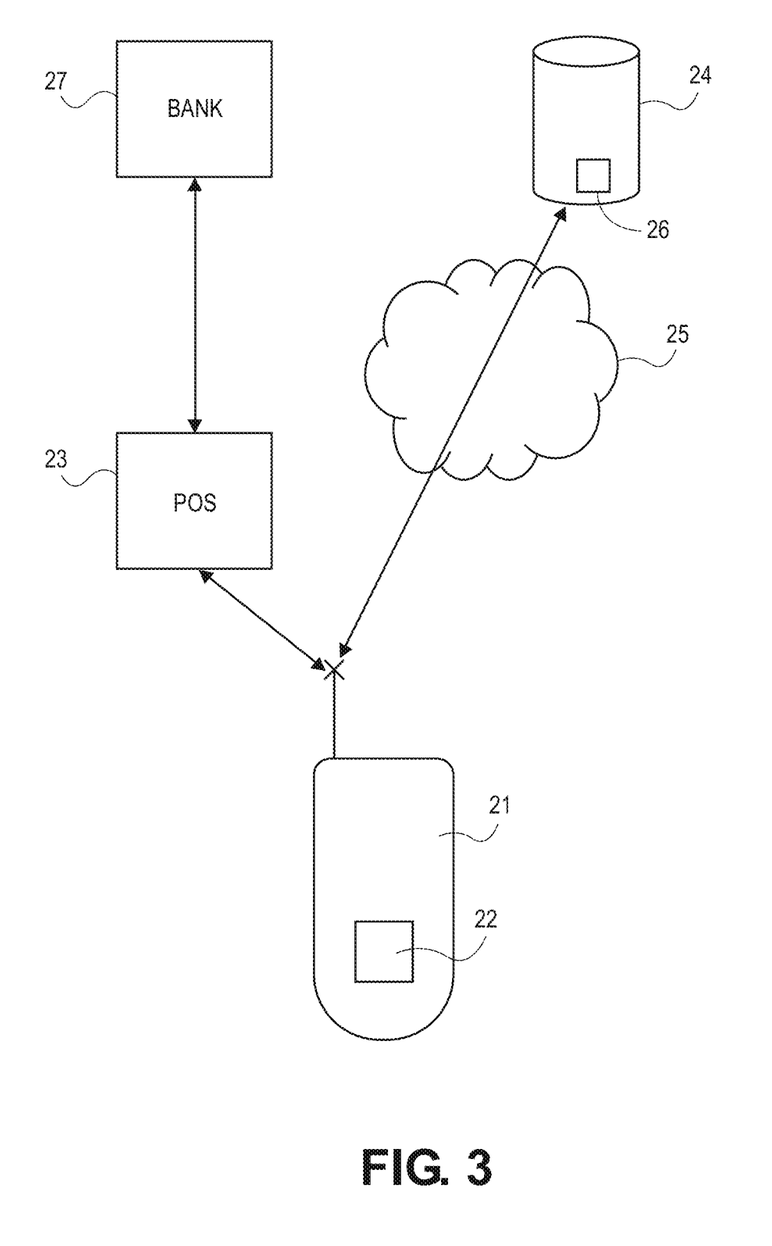
FIG. 3 is a diagram of a transaction arrangement system using a mobile phone according to the invention.

An example of a first method of making transactions using a mobile communications device will now be described with reference to FIGS. 3 and 4. FIG. 3 shows the apparatus used to make the transaction, while FIG. 4 is a flowchart of the first method of operation.

Figure 4:
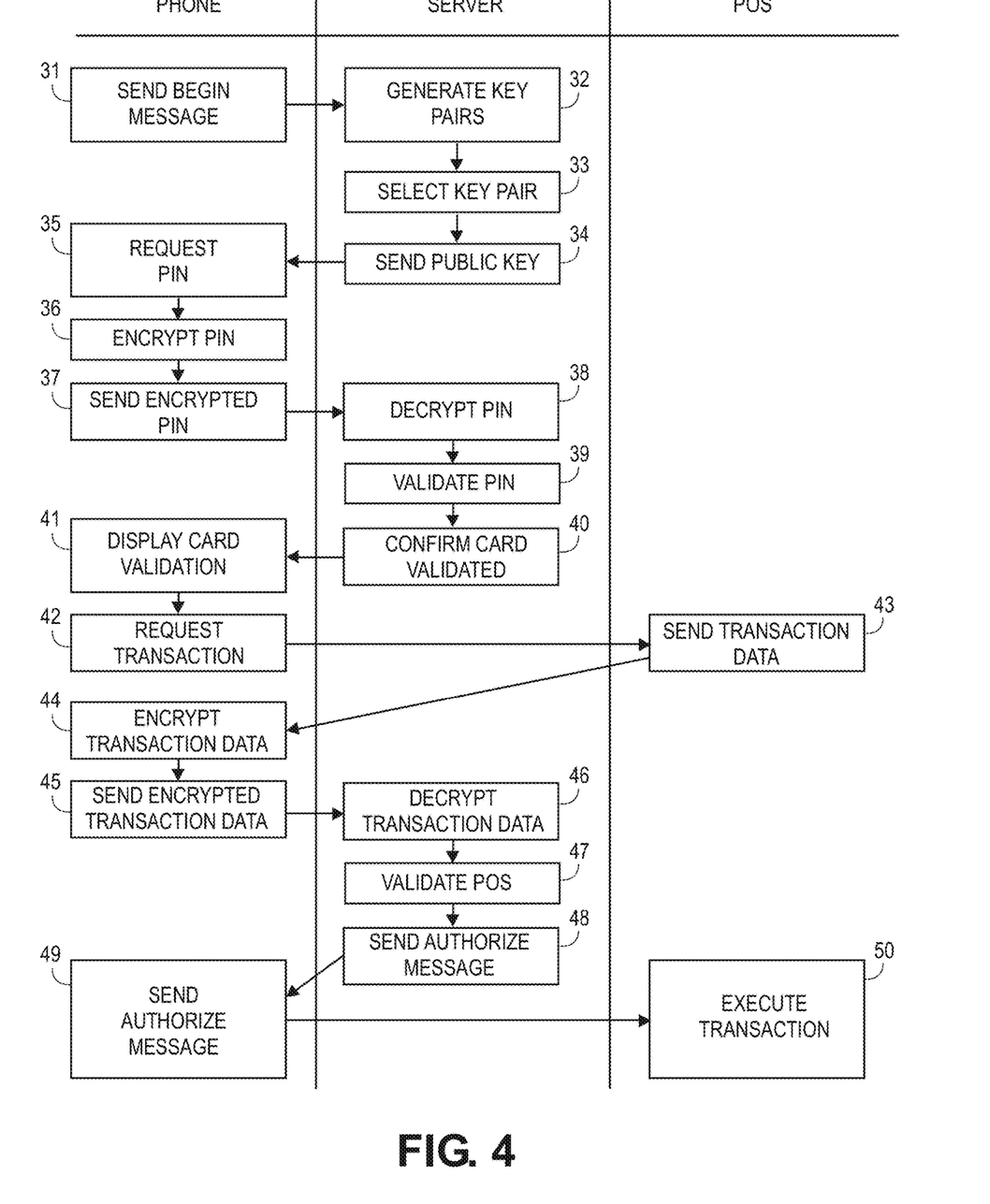
FIG. 4 is a flow chart of a first method of operation of the arrangement system of FIG. 3.

In the example of FIG. 3 and FIG. 4 the mobile communication device is a mobile phone 21. The mobile phone 21 may for example be a smartphone. The mobile phone 21 includes an electronic processor or chip 22 supporting secure transaction software. In the illustrated example the chip 22 is an embedded chip integrated with other electronic components of the mobile phone 21. In other examples the chip 22 may be mounted on a removable memory card of the phone 21, such as a microSD card. In other examples the chip 22 may be integrated with a SIM card of the phone. In one example the transaction may be of the EMV type.

The mobile phone 21 contains an electronic wallet. The electronic wallet is a virtual wallet able to interact with the secure transaction software supported by the chip 22.

The secure transaction software stores details of at least one virtual card corresponding to a user financial account on the mobile phone 21 in a secure manner. The stored details of the virtual cards may include credentials and/or certificates authenticating the virtual card. The secure transaction software may contain details of a plurality of different virtual cards corresponding to different financial accounts. The virtual cards may for example include virtual credit cards corresponding to credit accounts and/or virtual payment or debit cards corresponding to accounts containing funds. The secure transaction software displays the virtual cards to the user as contents of the virtual wallet.

A user wishing to make a transaction approaches a point of sale (POS) terminal or device 23, accesses the electronic wallet on their mobile phone 21 and selects a desired virtual card. Typically, in a retail transaction the POS device 23 is located at a sales desk, or is carried by retail staff. This accessing and selection may be carried using user input elements on the mobile phone 21. In some examples the user input elements may comprise a touchscreen. In general, it is not significant whether the user selects the desired virtual card before or after approaching the POS device 23, and either may be done, as expedient, in any specific example.

In some examples the selection may be by default without any user action being necessary. In examples where the wallet contains details of only one virtual card this card may be selected by default without user action, and in some examples without any opportunity for a user selection action being given, since the only virtual card available must be used if the transaction is to proceed. In some examples where the wallet contains details of multiple virtual cards the selection may still be by default. In some examples a user may be able to preselect a default virtual card to be used. In some examples the default virtual card may be used until the user selects another virtual card to be the default virtual card. In some examples the user may be able to override the default virtual card and select a different virtual card for a specific transaction.

When the desired virtual card has been selected the secure transaction software of the mobile phone 21 uses a data communication mechanism of the mobile phone 21, for example GSM, to send a begin transaction session message to a remote security server 24 through a public communications network, such as the Internet 25 in a step 31 shown in FIG. 4. The begin transaction message contains device identification data identifying the mobile phone 21 and card identification data identifying the selected virtual card. The secure transaction software of the mobile phone 21 manages secure communication between the mobile phone 21 and the server 24.

In some examples the begin transaction message may also include a random number. The random number may be used as a cryptographic seed for encrypted communication. The random number may be a pseudo-random number.

The security server 24 contains a secure element 26 corresponding to the selected virtual card. The secure element comprises at least a stored user PIN and eligible device identification data. The data stored on the security server 24 is protected against unauthorized access using suitable methods. In some examples data may be stored on the security server 24 in an encrypted form. Suitable methods of securing data are well known and do not need to be discussed in detail in the present application.

When the security server 24 receives the begin transaction session message the secure element 26 generates a plurality of asymmetric key pairs in step 32. The asymmetric key pairs are pairs of corresponding public and private encryption keys. The secure element 26 then randomly selects one of the generated asymmetric key pairs in step 33, and sends the public key of the selected asymmetric key pair to the mobile phone 21 in step 34. This public key is sent to the mobile phone 21 through the Internet 25. The private key held by the secure element 26 on the server 24 and the public key sent to the mobile phone 21 are used to encrypt communications between the server 24 and the mobile phone 21, as will be explained below. At the mobile phone 21 this encrypted communication is managed by the secure transaction software. In some examples this encryption may use a public key infrastructure (PKI) protocol.

Optionally, when the wallet contains details of more than one virtual card, when the security server 24 receives the begin transaction session message the number of asymmetric key pairs generated is the same as the number of virtual cards.

Optionally, in some examples, when the begin transaction session message is received the secure element 26 generates only a single asymmetric key pair in step 32. The secure element 26 then sends the public key of the asymmetric key pair to the mobile phone 21 in step 34. In such examples the selection step 33 is omitted. However, it is expected that when the wallet contains details of more than one virtual card, generating a plurality of asymmetric key pairs will provide greater security by allowing different virtual cards to use different key pairs so that there is key separation between the different virtual cards.

Optionally, in some examples, when the security server 24 receives the begin transaction session message the secure element 26 may compare the device identification data with stored eligible device identification data to verify device eligibility.

In examples where the electronic wallet 22 contains details of a plurality of different virtual cards, the secure elements corresponding to the different virtual cards may be on the same or different security servers 24.

The mobile phone 21 requests entry of a user PIN in step 35. When the user enters their PIN using user input elements on the mobile phone 21, for example a phone keypad, the mobile phone 21 encrypts the user entered PIN and the device identification data identifying the mobile phone 21 using the received public key in step 36. The mobile phone 21 then sends the encrypted user entered PIN and device identification data to the security server 24 through the Internet 25 in step 37.

It is not essential that the user PIN entry is requested by the mobile phone 21 after the mobile phone 21 receives the public key from the security server 24. In alternative examples the mobile phone 21 could request user PIN entry earlier, and store the user entered PIN until the public key is received. However, it is generally preferred to only request user PIN entry after the public key is received in order to avoid unnecessary requests for user PIN entry where the transaction session fails to proceed properly and the public key is not received at the mobile phone 21. This may improve security and minimize user inconvenience. In examples which request user PIN entry before the mobile phone 21 receives the public key from the security server 24 the user entered PIN may be stored in an encrypted form.

When the security server 24 receives the encrypted user entered PIN the secure element 26 decrypts the user entered PIN using the private key of the selected key pair in step 38. The secure element 26 then compares the decrypted user entered PIN with the stored user PIN for the selected virtual card to verify the user entered PIN, and compares the device identification data with stored eligible device identification data in step 39 to verify the user identity and device eligibility.

If the authentication is successful the security server 24 sends a message to the mobile phone 21 in step 40 confirming that use of the selected virtual card has been validated.

In some examples where the secure element 26 verifies device eligibility when the security server 24 receives the begin transaction session message, the secure element 26 may not validate device eligibility again when the encrypted user entered PIN is received.

When the mobile phone 21 receives the card validation message, the mobile phone 21 confirms to the user that the selected virtual card has been validated in step 41. This message prompts the user to present the mobile phone 21 to the POS device 23, if the user has not already done so.

When the mobile phone 21 has received the card validation message and is able to communicate with the POS device 23, the mobile phone 21 then establishes direct communication with the POS device 23, for example using near field communication (NFC). In some examples NFC according to communications protocol RFID ISO/IEC 14443 may be used. The communications between the mobile phone 21 and the POS device 23 are encrypted for security. In some examples a secure channel may be established between the mobile phone 21 and the POS device 23 using a key arrangement protocol such as a Diffie-Hellman key exchange.

The mobile phone 21 then sends a message requesting that the transaction should be carried out to the POS device 23 in step 42. This transaction request message includes card data identifying the selected virtual card.

The POS device 23 confirms that the identified selected virtual card is a card which is acceptable. In examples where the transaction is a retail transaction in a store, the POS device 23 may confirm that the selected virtual card is of a type accepted by the store. If the virtual card is confirmed to be acceptable, the POS device 23 responds to the transaction request message by sending transaction data regarding the transaction to the mobile phone in step 43 using the same communication method as the mobile phone 21, for example NFC. The transaction data comprises data identifying the POS device 23 and the amount of the transaction.

The mobile phone 21 encrypts the transaction data using the previously received public key in step 44, and then sends the encrypted transaction data to the security server 24 through the Internet 25 in step 45.

When the security server 24 receives the encrypted transaction data, the secure element 26 decrypts the transaction data using the private key of the selected key pair in step 46. The secure element 26 then compares the data identifying the POS device 23 with a database of authorized POS devices to verify POS device eligibility, in step 47.

If the verification of the POS device 23 is successful, the secure element 26 generates transaction authorization data and the security server 24 sends the transaction authorization data to the mobile phone 21 through the Internet 25 in step 48. In some examples the transaction authorization data may be encrypted. In some examples where the transaction is of the EMV type, the transaction authorization data may be in the form of an Authorization Request Cryptogram (ARQC).

In some examples the POS device 23 may include a nonce in the transaction data, that is, a one use number or bit string, sometimes referred to as an unpredictable number. This ensures that each transaction authorization data is unique, even for transactions using the same card at the same POS device for the same transaction amount, and that one transaction authorization data from a POS device cannot be used to predict future transaction authorization data from that device. This may prevent fraud by of the "pre-play" type where the same transaction authorization data is used to repeatedly carry out the same transaction, or where one transaction authorization data is used to generate false transaction authorization data.

When the mobile phone 21 receives the transaction authorization data, the mobile phone forwards the transaction authorization data to the POS device 23 in step 49.

On receiving the transaction authorization data the POS device 23 confirms that the transaction authorization data is valid. If the transaction authorization data is valid, the POS device 23 then executes the transaction in step 50.

In order to execute the transaction the POS device 23 contacts a bank system 27, generally by telephone or some other landline communications network, and sends card data identifying the selected virtual card, POS data identifying the POS device 23, and the value of the transaction to the bank system 27.

The bank system 27 checks the received card data and POS data and performs authentication processes to confirm that the selected virtual card and POS device 23 are authentic and authorized, and checks the available funds or credit in the account corresponding to the selected virtual card to confirm that the available funds or credit are sufficient to cover the transaction. In some examples the bank system 27 may communicate with the security server 24 to carry out the authentication.

If the authentications are successful and the necessary funds or credit is available, the bank system 27 sends authorization to complete the transaction to the POS device. The POS device 23 then completes the transaction and sends confirmation of completion of the transaction to the bank system 27. A bank back end system of the bank system 27 then makes any necessary changes to the balance of the account corresponding to the selected virtual card and/or other bank records, as appropriate.

Communications between the POS device 23 and the bank system 27 may be encrypted. Suitable methods of secure and encrypted communication between POS devices and bank systems are well known and need not be described in detail in the present application.

It will be understood from the above description that the first method can only be used when the mobile phone 21 is able to communicate with the security server 24 at the time when the user attempts to make the desired transaction. In other words, the first method must be carried out on-line. However, there are locations and times where network connectivity from mobile phones is completely or sporadically unavailable and in practice it is to be expected that users may still wish to make transactions at these locations and times.

In order to allow transactions to be carried out at such locations and times a second method of making off line transactions may be used.

An example of the second method of making transactions using a mobile communications device will now be described with reference to FIGS. 3, 5 and 6. FIG. 3 shows the apparatus used to make the transaction, which is the same apparatus as in the first example, while FIGS. 5 and 6 are flowcharts of the second method of operation.

Figure 5:
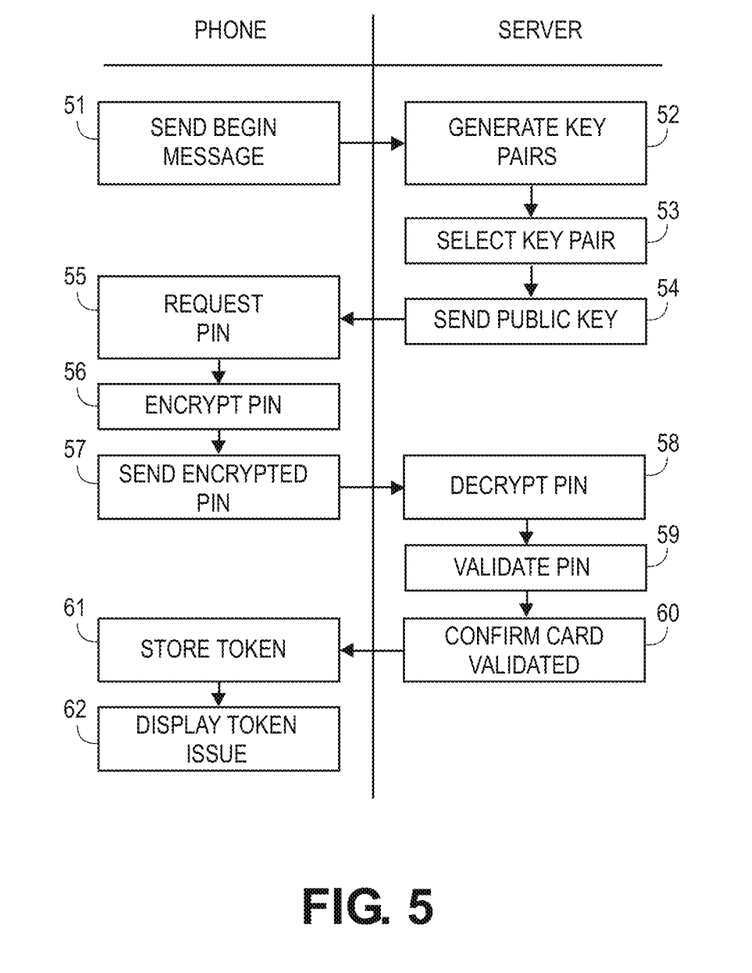
FIG. 5 is a flow chart of a part of a second method of operation of the arrangement system of FIG. 3.
Figure 6:
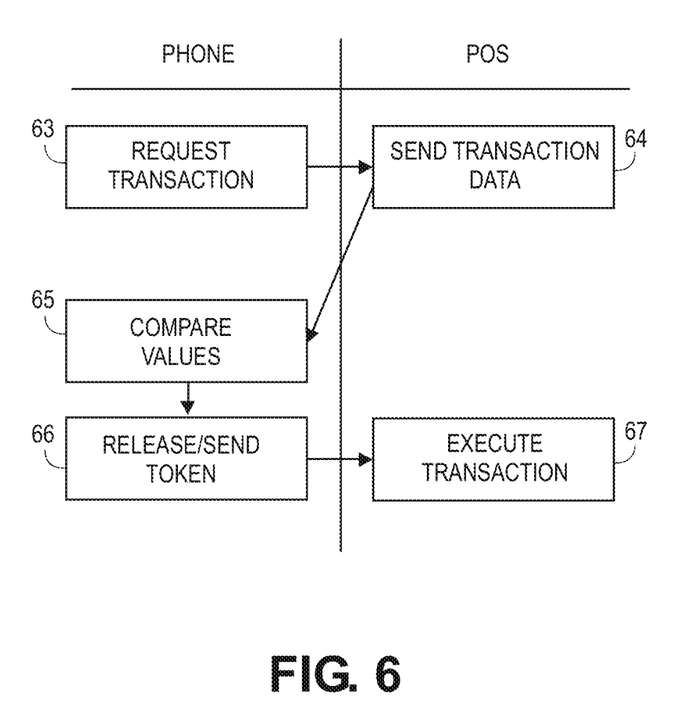
FIG. 6 is a flow chart of another part of the second method of operation of the arrangement system of FIG. 3.

In the example of the second method shown in FIGS. 5 and 6 the mobile communication device is a mobile phone 21 including an electronic processor or chip 22 supporting secure transaction software, and also containing an electronic wallet, similar to the first method described above. Similarly to the first method the transaction may be of the EMV type.

Similarly to the first method, the secure transaction software stores details of at least one virtual card corresponding to a user financial account on the mobile phone 21 in a secure manner.

A user wishing to have the facility to make future transactions without communications network access, that is, without communications network access at the time the transaction is made, can request this facility from the security server 24. This request must be made at a time when the mobile phone 21 has communications network access enabling the mobile phone 21 to communicate with the secure server 24.

A user wishing to have the facility to make transactions without communications network access in the future accesses the electronic wallet on their mobile phone 21 and first selects a desired virtual card held in the electronic wallet.

In some examples the selection may be by default without any user action being necessary, in a similar manner to the first method.

When the desired virtual card has been selected the secure transaction software of the mobile phone 21 uses a data communication mechanism of the mobile phone 21, for example GSM, to send a token request message to the remote security server 24 through a public communications network, such as the Internet 25, in a step 51 shown in FIG. 5. The begin transaction message contains device identification data identifying the mobile phone 21 and card identification data identifying the selected virtual card. The secure transaction software of the mobile phone 21 manages secure communication between the mobile phone 21 and the server 24.

Similarly to the first method, in some examples the begin transaction message may also include a random number.

As explained above regarding the first method, the security server 24 contains a secure element 26 corresponding to the selected virtual card.

When the security server 24 receives the token request message the secure element 26 generates a plurality of asymmetric key pairs in step 52. The asymmetric key pairs are pairs of corresponding public and private encryption keys. The secure element 26 then randomly selects one of the generated asymmetric key pairs in step 53, and sends the public key of the selected asymmetric key pair to the mobile phone 21 in step 54. This public key is sent to the mobile phone 21 through the Internet 25. The private key held by the secure element 26 on the server 24 and the public key sent to the mobile phone 21 are used to encrypt communications between the server 24 and the mobile phone 21, as will be explained below. At the mobile phone 21 this encrypted communication is managed by the secure transaction software. In some examples this encryption may use a public key infrastructure (PKI) protocol.

Similarly to the first method, optionally, when the wallet contains details of more than one virtual card, the number of asymmetric key pairs generated is the same as the number of virtual cards. Similarly to the first method, optionally, the secure element 26 generates only a single asymmetric key pair in step 52 and the selection step 53 is omitted.

Optionally, in some examples, the secure element 26 may compare the device identification data with stored eligible device identification data to verify device eligibility.

Similarly to the first method, in examples where the electronic wallet 22 contains details of a plurality of different virtual cards, the secure elements corresponding to the different virtual cards may be on the same or different security servers 24.

The mobile phone 21 requests entry of a user PIN in step 55. When the user enters their PIN using user input elements on the mobile phone 21, for example a phone keypad, the mobile phone 21 encrypts the user entered PIN and the device identification data identifying the mobile phone 21 using the received public key in step 56. The mobile phone 21 then sends the encrypted user entered PIN and device identification data to the security server 24 through the Internet 25 in step 57.

Similarly to the first method, it is not essential that the user PIN entry is requested by the mobile phone 21 after the mobile phone 21 receives the public key from the security server 24. In alternative examples the mobile phone 21 could request user PIN entry earlier, and store the user entered PIN until the public key is received, possibly in an encrypted form.

When the security server 24 receives the encrypted user entered PIN the secure element 26 decrypts the user entered PIN using the private key of the selected key pair in step 38. The secure element 26 then compares the decrypted user entered PIN with the stored user PIN for the selected virtual card to verify the user entered PIN, and compares the device identification data with stored eligible device identification data in step 59 to verify the user identity and device eligibility.

If the authentication is successful the security server 24 generates a token and then sends the token to the mobile phone 21 in step 60. In some examples where the transaction is to be of the EMV type the token may comprise an Authorization Request Cryptogram (ARQC). In one example where the transaction is to be of the EMV type the token may comprise a PPSE Proximity Payment System Environment command response, a select payment command response, and an Authorization Request Cryptogram (ARQC).

When the mobile phone 21 receives the token, the mobile phone 21 stores the token in a step 61. The token indicates that the mobile phone 21 has been authenticated to carry out a transaction and indicates a maximum transaction value for which the token is valid. Each token is unique so that multiple use of the same token can be detected and prevented. In some examples, a unique number is used in creating each token so that each token is unique.

In some examples where the secure element 26 verifies device eligibility when the security server 24 receives the begin transaction session message, the secure element 26 may not validate device eligibility again when the encrypted user entered PIN is received.

When the mobile phone 21 receives the token, the mobile phone 21 confirms to the user that requested token has been received in a step 62.

Optionally, in examples where the wallet contains details of more than one virtual card, the mobile phone may display which virtual cards have an associated stored token.

The above description refers to the issue and storage in the mobile phone 21 of a token. In some examples multiple tokens may be issued and stored. In such examples the mobile phone 21 may display to the use the number of stored tokens which are available.

In some examples the maximum transaction value is the same for all tokens. In other examples different tokens may have different maximum transaction values. The mobile phone may display the maximum transaction value for which each stored token is valid.

In examples where tokens may have different maximum transaction values the token request message may request a token or tokens having specific values. In such examples the requested token values may be taken into account when deciding whether the device is eligible for token issue.

In examples where multiple tokens may be issued and stored there may be a maximum number of tokens which may be stored, so that further tokens may not be requested or issued when this maximum number is reached. Examples where only a single token may be stored may be regarded as having a number of tokens which may be stored of one. This maximum number may be defined for each virtual card, or for the mobile phone as a whole. In examples where tokens may have different maximum transaction values there may be a maximum total value of stored tokens which may be stored, so that further tokens may not be requested or issued when this maximum value is reached. This maximum value may be defined for each virtual card, or for the mobile phone as a whole.

When a user subsequently wishes to carry out a transaction, for example a purchase, but the mobile phone 21 has no communications connection to the security server 24, for example when the mobile phone 21 is in a location having no network coverage, the user approaches a point of sale (POS) terminal or device 23, accesses the electronic wallet on their mobile phone 21 and selects a desired virtual card for which a token is stored on the mobile phone 21.

In some examples the selection may be by default without any user action being necessary. In examples where the wallet contains details of only one virtual card for which a token is stored this card may be selected by default without user action, and in some examples without any opportunity for a user selection action being given, since the only token available must be used if the transaction is to proceed. In some examples where the wallet contains details of multiple virtual cards for which tokens are saved the selection may still be by default. In some examples a user may be able to preselect a default virtual card to be used. In some examples the default virtual card may be used until the user selects another virtual card to be the default virtual card. In some examples the user may be able to override the default virtual card and select a different virtual card for a specific transaction.

In some examples the user may be advised by the mobile phone 21 that there is no communications connection available and the user may select to use a token to carry out the desired transaction. In other examples the mobile phone 21 may automatically use a token to carry out the desired transaction if no communications connection is available. In such examples the mobile phone 21 may display a message informing the user that this has been done.

When the mobile phone 21 is able to communicate with the POS device 23, the mobile phone 21 establishes direct communication with the POS device 23, in a similar manner to the first method. The mobile phone 21 then sends a message requesting that the transaction should be carried out to the POS device 23 in step 63. This transaction request message includes card data identifying the selected virtual card.

In some examples, before requesting that the transaction should be carried out the mobile phone 21 confirms that the POS device 23 is a device of a suitable type to carry out off line token based transactions.

The POS device 23 confirms that the identified selected virtual card is a card which is acceptable. In examples where the transaction is a retail transaction in a store, the POS device 23 may confirm that the selected virtual card is of a type accepted by the store. If the virtual card is confirmed to be acceptable, the POS device 23 responds to the transaction request message by sending transaction data regarding the transaction to the mobile phone in step 64 using the same communication method as the mobile phone 21, for example NFC. The transaction data comprises data identifying the POS device 23 and the amount of the transaction.

The mobile phone 21 then compares the amount of the transaction comprised in the transaction data to the maximum transaction value for which a stored token for the selected virtual card is valid in a step 65. If the transaction value is equal to or less than the maximum transaction value the mobile phone 21 releases the stored token and sends this to the POS device 23 in a step 66.

On receiving the token the POS device 23 confirms that the token is valid. If the token is valid, the POS device 23 then executes the transaction in step 67.

In order to execute the transaction the POS device 23 contacts a bank system 27, generally by telephone or some other landline communications network, and sends card data identifying the selected virtual card, POS data identifying the POS device 23, and the value of the transaction to the bank system 27.

The POS device 23 may also send the token, or data extracted from the token, to the bank system 27.

In some examples the POS device 23 may confirm to the bank system 27 that the transaction is based upon a token. In some examples this may be implicit form the data sent to the bank system 27 by the POS device 23, for example when the token itself is sent, so that it may not be necessary to state this explicitly.

The bank system 27 checks the received card data and POS data and performs an authentication process to confirm that the selected virtual card and POS device 23 are authentic and authorized, and checks the available funds or credit in the account corresponding to the selected virtual card to confirm that the available funds or credit are sufficient to cover the transaction.

As a part of the authentication process the bank system 27 checks that the token has not already been used. In examples where a unique number is used in creating each token, confirming that the token is valid may include determining this unique number from the token and determining whether a token created using this unique number has already been used.

Checking that the token has not already been used may prevent re-play attacks in which copies, however obtained, of tokens are used to carry out unauthorized transactions.

In some examples the bank system 27 may communicate with the security server 24 to carry out the authentication process.

If the authentications are successful and the necessary funds or credit is available, the bank system 27 sends authorization to complete the transaction to the POS device. The POS device 23 then completes the transaction and sends confirmation of completion of the transaction to the bank system 27. A bank back end system of the bank system 27 then makes any necessary changes to the balance of the account corresponding to the selected virtual card and/or other bank records, as appropriate.

Communications between the POS device 23 and the bank system 27 may be encrypted. Suitable methods of secure and encrypted communication between POS devices and bank systems are well known and need not be described in detail in the present application.

The token of the second method is similar to the transaction authorization data of the first method, and the token and transaction authorization data are treated in a similar manner by the POS device 23 and bank system 27. In some examples both the token and the transaction authorization data may be ARQCs.

The transaction authorization data of the first method comprises data identifying the POS device and the amount of the transaction. It will be understood that the token of the second method cannot include this data because the identity of the POS and the transaction value are not known when the token is generated. In some examples the transaction authorization data and the token have a common format, with the transaction authorization data including data identifying the POS device and the amount of the transaction, and the token comprising null values in place of the data identifying the POS device and the amount of the transaction. This use of a common format may make it simpler for the POS devices and bank systems to carry out both methods.

In some examples of the second method, the token may be generated by the security server 24 using a generation method including at least one variable component so that the identity of the user account linked with the virtual card and the token cannot be determined from the token, and so that data taken from one token cannot be used to produce another valid token. This may prevent third parties making malicious misuse of tokens. In one example this generation method may comprise the use of a dynamic PAN (Primary Account Number). In such examples communication between the bank system 27 and the security server 24 may be required in order to determine whether a token is valid as part of the authentication process. In one example the bank system 27 may use a one use look up table to determine whether a token is valid. This look up table may be provided by the security server 24.

The use of tokens according to the second method may allow the amount of risk to the token issuer associated with transactions carried out without a network connection to be managed.

In some examples the first and second methods discussed above may advantageously be offered for use together. In such examples, when a user attempts to use a mobile phone to carry out a transaction at a POS device the mobile phone may carry out the first method of making a transaction if communications to the security server are available, and carry out the second method if communications to the security server are not available and at least one suitable token is stored on the mobile phone.

In the example of the second method described above the user requests the issue of tokens and enters a user PIN to authenticate the request and enable the issue of the tokens. In other examples the mobile phone may automatically request the issue of a token or tokens from the security server when a communication channel between the mobile phone and the security server is available. In such examples the request for the issue of a token or tokens and the granting of the request and issuing of the requested token or tokens will be dependent on the number or value of any stored tokens being less than the maximum number or value of tokens which may be stored.

In the example of the second method described above authentication of the user by entry of a user PIN is required each time a token or tokens are issued. In other examples the security server may require authentication of the user intermittently by requesting entry of the user PIN in order to enable the continued issue of tokens to the mobile phone. The timing of the intermittent requests for authentication may be time based, for example periodic, or may be based on the number and/or value of the tokens issued and/or used. In other examples the security server may require authentication of the user by requesting entry of the user PIN only when the issue of tokens is first requested.

In the example of the second method described above the token has a maximum transaction value. This transaction value may be a single value defined for one currency only, or may comprise a plurality of values in respective different currencies. When the mobile phone 21 compares the amount of the transaction comprised in the transaction data to the maximum transaction value for which a stored token for the selected virtual card is valid in step 65, this comparison may comprise a check that the currency of the transaction is a currency for which the token has a defined value. If the currency of the transaction is a currency for which the token does not have a defined value the transaction is treated as being for more than the maximum transaction value and the stored token is not released.

The example of the second method described above assumes that tokens are issued on request from the mobile phone provided that any user authentication is successful. It will be understood that the security server may have set limits on the number or value of tokens that may be issued to any specific user based on issuer defined risk management and transaction limit policies.

Figure 7:
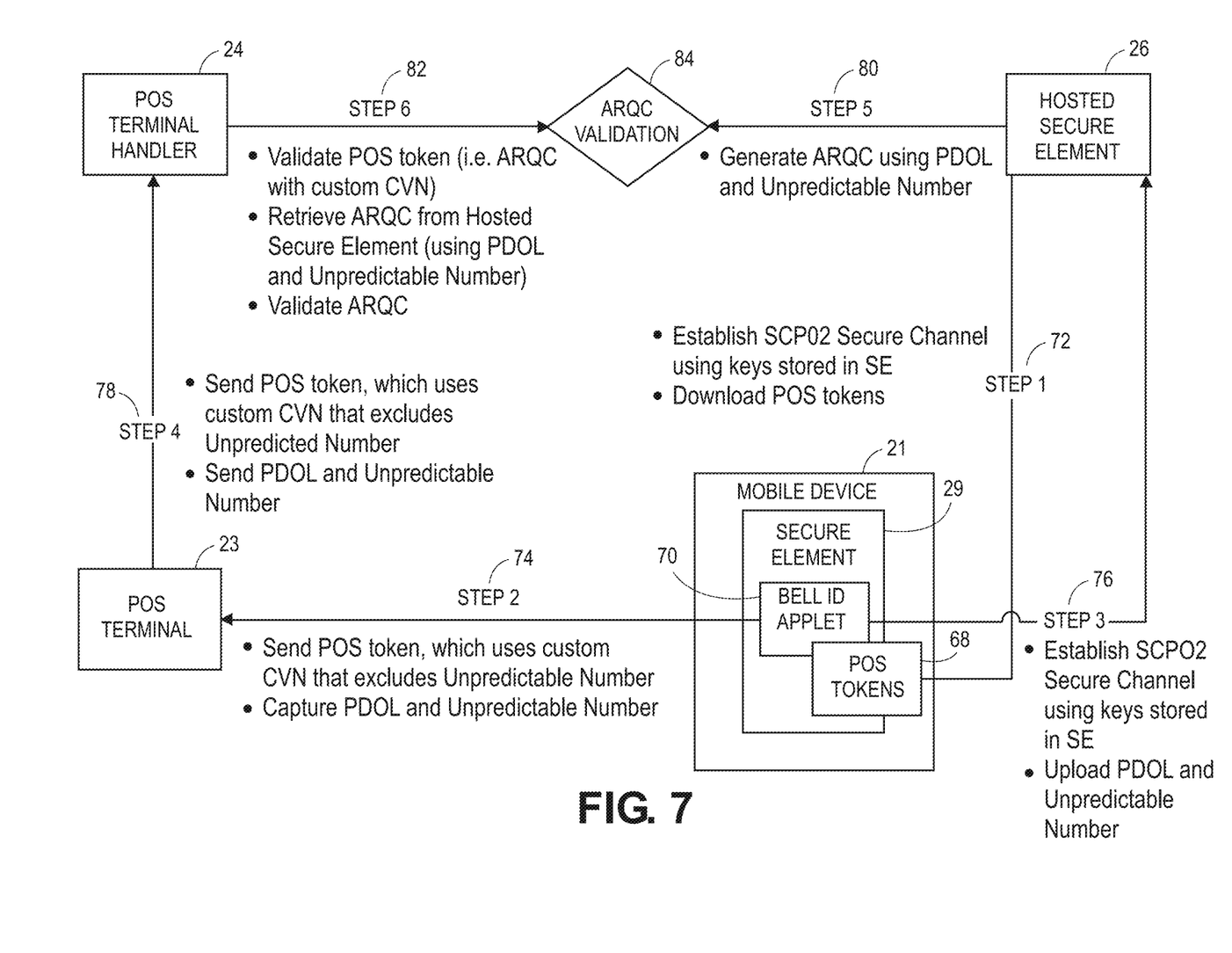
FIG. 7 is a more explicit diagram of the transaction arrangement system of FIG. 3 illustrating some aspects of the second method of operation in accordance with the flow chart of FIGS. 5 and 6.

Referring to FIG. 7, shown is a more explicit diagram of the transaction arrangement system of FIG. 3 illustrating some aspects of the second method of operation according to the flow chart of FIGS. 5 and 6 where like numerals to those used in FIG. 3 will be utilized to denote like or equivalent parts of the system. The mobile phone 21 hosts a secure element 29 and a POS token store 68. The secure element 29 is arranged to execute an applet 70 which communicates securely with the hosted secure element 26 of the server 24 (FIG. 3). The POS 23 connects to the bank 27 as before, but referred to hereinafter as the POS terminal handler 27.

FIG. 7, in addition to illustrating a more explicit diagram of the transaction arrangement system of FIG. 3, also presents a graphical representation of the flow of steps for performing a payment transaction using the secure element (SE) in the Cloud (SEITC) solution as described herein. The flow of steps are as follows:

Step 1 (72): The SEITC server 24 loads a new set of pre-authorized EMV tokens (referred to as tokens) in the SE applet 70 on the mobile device 21, i.e. it stores the tokens in the token store 68 which is under the control of the applet 70.

a) Prior to a payment transaction, a mobile device application connects to the server 24 and requests some tokens.

b) The server 24 sends application protocol data units (APDUs) to the secure element (SE) 29 on the mobile device 21 to setup a secure channel which may use Secure Channel Protocol 02 (SCP02) with the SE 29. This may involve multiple round trips in which the server 24 and the SE 29 exchange APDU Commands and APDU responses respectively. Note that a mobile device application may be used to relay the APDU commands and responses between the server 24 and the mobile device secure element applet 70.

c) Within the secure channel, the server 24 sends APDUs to store the tokens in the mobile device SE applet 70. Note that the tokens are based on static data only. Dynamic data (the Processing Options Data Object List (PDOL) data that includes the Unpredictable Number) are not available prior to an actual payment transaction taking place because these are generated by the Point of Sale (POS) device or terminal 23.

Step 2 (74): A payment transaction is initiated using the SE 26 that is hosted in the cloud network, i.e. hosted on the server 24.

a) A consumer taps his mobile device 21 to the POS device 23. The POS device 23 sends APDU commands to the mobile device SE applet 70. The mobile device SE applet 70 answers these with APDU responses stored in the token as if it was a normal payment transaction where an SE payment applet would be used. Note that no mobile device application is required here.

b) The token contains a custom Cryptogram Version Number (CVN) to indicate to the Payment Authorization Host (the bank 27) that this payment transaction is performed using a token, and it should be validated as such.

c) During the transaction the POS device 23 generates the PDOL data (including the Unpredictable Number) that are stored in the mobile device SE applet 70. Step 3 (76): A secure channel (SCP02) is created between the server 24 and the mobile device SE applet 70. Within the secure channel the mobile device SE applet 70 sends the PDOL, including the Unpredictable Number, to the server 24.

Step 4 (78): The POS device 23 sends the token (including the custom CVN), the PDOL data, including the Unpredictable Number to the POS Terminal Handler/Payment Authorization Host 27.

Step 5 (80): Based on the PDOL data, including the Unpredictable Number, the server 24 generates a new (non-static) ARQC and sends this to a system that will perform ARQC validation.

Step 6 (82): The payment transaction is completed.

a) The Payment Authorization Host 27 validates the ARQC of the token. Note that the custom CVN informs the POS Terminal Handler/Payment Authorization Host 27 how the token should be validated.

b) The POS Terminal Hander 27 then generates a new ARQC based on the PDOL, including the Unpredictable Number and sends this to the system 84 that performs ARQC validation. The ARQC validation system 84 will compare this new ARQC with the ARQC that was sent from the server 24. If the ARQCs match the transaction is authorized.

It should be noted that steps 3 and 5 basically ensure that the tokens that are used in the payment transactions are really coming from a device that is used in the payment transaction (i.e. device authentication). If the mobile device 21 has no network connectivity, it is still possible to perform a payment transaction using an EMV token without step 3 and step 5. However, it is the responsibility of the Payment Authorization Host 27 to decide whether such offline transactions are to be allowed, as they are less secure which may make the Financial Institution (the bank 27) liable in case of fraud.

The descriptions of the above examples explain the payment process in the usual case where the transaction and parties are legitimate and all of the authentications are successful. It will be understood that, in general, if an authentication fails the transaction will be aborted or delayed while further checks or alternative procedures are followed. The decision whether to abort or delay the transaction, and/or exactly what further or alternative action will be taken will vary from case to case.

The secure transaction software may also manage the creation of new virtual cards on the mobile phone and the downloading and storing of the necessary virtual card details such as authenticating credentials and/or certificates. In some examples this may be carried out by loading a suitable app onto the mobile phone. Standard over the air (OTA) protocols may be used, for example SMS or CATTP.

As is explained above, the described methods allows the secure element which carries out critical security functions of verifying the mobile device and user identity to be located at a remote security server, rather than on the mobile phone itself. This allows the operator of the security server, for example a bank, to maintain full control of the security system. This may allow them to define or change the security system unilaterally without requiring the agreement and cooperation of all of these parties.

Further, the memory and processing power requirements of the secure element can be largely transferred from the mobile device to the server. Accordingly, there may be fewer problems of mobile phones, or processors associated with the mobile phones, not being able to support the security system, even if the security system is improved over time to counter new threats.

Further, any possible increased security risks when the mobile phone is a smartphone may be avoided because the secure element is on the server and is not directly accessible from the mobile phone.

In the above examples the mobile communication device is a mobile phone. In other examples other mobile communication devices may be used, such as a smartphone or a tablet computer. This list of examples is not intended to be exhaustive.

The above examples refer to the mobile phone sending data identifying a virtual card. This data may be regarded as identifying a user financial account. Further, in some examples the data may identify a user financial account without identifying the corresponding virtual card. Since the virtual card is virtual it is only necessary that the data identifies the user financial account corresponding to the virtual card, it is not essential that the data identifies the virtual card itself. In some examples the virtual card and the corresponding user financial account will be identified by the same number so that data identifying the user financial account will identify the virtual card, and vice-versa.

The above examples refer to the use of a user PIN to verify a user's identity. In other examples other forms of user identity verifier may be used, provided that the mobile phone is able to support them. For example, a user may be identified by a cryptogram, a gesture, a pressure profile of a user signature, or user biometrics. This list of examples is not intended to be exhaustive.

The description above relates to the use of the methods and system to make purchases. In other examples the methods and system can be used to carry out other types of transaction. In some examples, the POS device could be an electronic door lock and the transaction could be the unlocking of the door so that the mobile communication device can be used as a door key.

These examples may be particularly useful in hotels. In other examples the POS device could be an access control device such as a turnstile or barrier so that the mobile communication device can be used as a pass or ticket. These examples may be useful for security or allowing passengers onto trains. In other examples the POS device could permit access to or control of parts of a computer system or network, for example allowing access to a part of a network through a logical portal.

The examples described above use the Internet as a public communications network. In other examples other communications may be used. In some examples the public communications network may be GPRS or an MNO owned data packet network.

The apparatus described above may be implemented at least in part in software. Those skilled in the art will appreciate that the apparatus described above may be implemented using general purpose computer equipment or using bespoke equipment.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Here, aspects of the methods and apparatuses described herein can be executed on a mobile station and on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A method of providing secure services using a mobile device, the method comprising:
   sending, by the mobile device, a token request comprising device identification data identifying the mobile device to a server;
   receiving, by the mobile device, a public key of an asymmetric key pair comprising the public key and a private key, from the server;
   requesting, by the mobile device, entry of a user identity verifier;
   receiving, by the mobile device, the user identity verifier;
   encrypting, by the mobile device, the entered user identity verifier using the public key and sending the encrypted user identity verifier to the server;
   receiving, by the mobile device, a token from the server, the token indicating that the user identity verifier in the encrypted user identity verifier matches a stored user identity verifier and the device identification data matches stored eligible device identification data;
   storing, by the mobile device, the token;
   establishing, by the mobile device when the mobile device does not have network connectivity, communication with a service provider device;
   sending, by the mobile device to the service provider device when the mobile device does not have network connectivity, a message requesting a service from the service provider device;
   receiving, by the mobile device when the mobile device does not have network connectivity, service data regarding the requested service from the service provider device, the service data comprising a transaction amount associated with the requested service;
   determining, by the mobile device when the mobile device does not have network connectivity, that the transaction amount associated with the requested service satisfies a transaction amount limit associated with the token; and
   in response to determining that the transaction amount associated with the requested service satisfies the transaction amount limit associated with the token, sending, by the mobile device when the mobile device does not have network connectivity, the token to the service provider device to confirm that the token is valid.

2. The method according to claim 1, wherein the mobile device requests entry of the user identity verifier each time the server receives a token request.

3. The method according to claim 1, wherein the mobile device requests entry of the user identity verifier intermittently.

4. The method according to claim 3, wherein the mobile device requests entry of the user identity verifier intermittently based on at least one of: time; number of tokens issued; or value of tokens issued.

5. The method according to claim 1, wherein the mobile device requests entry of the user identity verifier the first time the server receives a token request.

6. The method according to claim 1, wherein the mobile device requests and stores a plurality of tokens.

7. The method according to claim 1, wherein the token request further comprises account identification data identifying a financial account and the token can be used to identify the financial account.

8. The method according to claim 7, wherein to provide the requested service, the service provider device
   contacts a bank system and bank system data identifying a financial account, service provider device data, and the service data to the bank system, the bank system verifying the data identifying the financial account and the service provider device data, verifying that the financial account can support the requested service, and sending authorization to complete the service to the service provider device; and
   completes the requested service.

9. The method according to claim 8, wherein the data identifying the financial account is derived from the token.

10. The method according to claim 8, wherein the data identifying the financial account is the token.

11. The method of claim 1, wherein the token is a cryptogram.

12. The method of claim 1, wherein the token is an Authorized Request Cryptogram (ARQC).

13. The method of claim 1, wherein the mobile device is a mobile phone.

14. The method of claim 1, wherein the user identity verifier is a PIN of a user of the mobile device.

15. A mobile device comprising:
    memory; and
    a processing device coupled to the memory, the processing device to execute instructions from the memory to:
    send a token request comprising device identification data identifying the mobile device to a server;
    receive a public key of an asymmetric key pair comprising the public key and a private key, from the server;
    request entry of a user identity verifier;
    receive the user identity verifier;
    encrypt the entered user identity verifier using the public key and send the encrypted user identity verifier to the server;
    receive a token from the server, the token indicating that the user identity verifier in the encrypted user identity verifier matches a stored user identity verifier and the device identification data matches stored eligible device identification data;
    store the token in the memory;
    establish communication with a service provider device when the mobile device does not have network connectivity;
    send, to the service provider device when the mobile device does not have network connectivity, a message requesting a service from the service provider device;
    receive service data regarding the requested service from the service provider device when the mobile device does not have network connectivity, the service data comprising a transaction amount associated with the requested service;
    determine that the transaction amount associated with the requested service satisfies a transaction amount limit associated with the token when the mobile device does not have network connectivity; and
    in response to determining that the transaction amount associated with the requested service satisfies the transaction amount limit associated with the token, send the token to the service provider device when the mobile device does not have network connectivity, to confirm that the token is valid.

16. The mobile device of claim 15, wherein the token is a cryptogram.

17. The mobile device of claim 15, wherein the mobile device is a mobile phone.

18. The mobile device of claim 15, wherein the token is an EMV token.

* * * * *

UNITED STATES PATENT AND TRADEMARK OFFICE
CERTIFICATE OF CORRECTION

PATENT NO. : 11,250,409 B2
APPLICATION NO. : 14/431204
DATED : February 15, 2022
INVENTOR(S) : Mohammed Chakib Bouda Page 1 of 1

It is certified that error appears in the above-identified patent and that said Letters Patent is hereby corrected as shown below:

On the Title Page

"Foreign Application Priority Data" Item (30), please remove "1217448" and insert -- 1217448.8 --

Signed and Sealed this
Third Day of May, 2022

Katherine Kelly Vidal
Director of the United States Patent and Trademark Office